US008684417B2

(12) United States Patent
Mallol et al.

(10) Patent No.: US 8,684,417 B2
(45) Date of Patent: Apr. 1, 2014

(54) SECURITY ELEMENT HAVING A DIGITISED MARK AND SECURITY SUPPORT OR DOCUMENT COMPRISING SAME

(75) Inventors: Stephane Mallol, Provins (FR); Nathalie Vast, Mont Saint Eloi (FR); Eveline Wagner, Vienna (AT); Matthias Muller, Bechtsrieth (DE)

(73) Assignees: Arjowiggins Security, Boulogne Billancourt (FR); Hueck Follien Gesellschaft m.b.H, Baumgartenberg (AT)

(*) Notice: Subject to any disclaimer, the term of this patent is extended or adjusted under 35 U.S.C. 154(b) by 502 days.

(21) Appl. No.: 11/722,566

(22) PCT Filed: Dec. 22, 2005

(86) PCT No.: PCT/EP2005/013895
§ 371 (c)(1), (2), (4) Date: Dec. 15, 2008

(87) PCT Pub. No.: WO2006/066927
PCT Pub. Date: Jun. 29, 2006

(65) Prior Publication Data

US 2009/0127845 A1 May 21, 2009

(30) Foreign Application Priority Data

Dec. 23, 2004 (EP) .................................... 04293111

(51) Int. Cl.
*B42D 15/00* (2006.01)
*G09C 3/00* (2006.01)

(52) U.S. Cl.
USPC .................. 283/93; 283/85; 283/91; 283/92; 283/72; 283/57; 283/58

(58) Field of Classification Search
USPC .................. 283/91–93, 83, 72, 57, 58, 8, 585
See application file for complete search history.

(56) References Cited

U.S. PATENT DOCUMENTS 5,044,707 A 9/1991 Mallik
5,411,296 A 5/1995 Mallik
5,573,639 A 11/1996 Schmitz et al.

(Continued)

FOREIGN PATENT DOCUMENTS

DE 3831688 A1 3/1990
DE 10255639 A1 6/2004

(Continued)

OTHER PUBLICATIONS

International Search Report of PCT/EP2005/013895, date of mailing Jul. 6, 2006.

(Continued)

*Primary Examiner* — Syed A Islam
(74) *Attorney, Agent, or Firm* — Westerman, Hattori, Daniels & Adrian, LLP

(57) ABSTRACT

The invention relates to a security element comprising a carrier substrate comprising a transparent or translucent area carrying at least one digitised mark made of at least one set of dots appearing as a three dimensional mark when viewed in transmitted light. The invention relates to a security support or document or article comprising the said security element and to the method of identification and/or authentication of this security support or document or article.

31 Claims, 3 Drawing Sheets

(56) References Cited

U.S. PATENT DOCUMENTS

| | | | |
|---|---|---|---|
| 5,816,619 | A | 10/1998 | Schaede |
| 6,089,614 | A * | 7/2000 | Howland et al. ................ 283/91 |
| 6,491,324 | B1 | 12/2002 | Schmitz et al. |
| 6,694,041 | B1 | 2/2004 | Brunk |
| 6,865,001 | B2 * | 3/2005 | Long et al. ......................... 359/2 |
| 7,883,762 | B2 * | 2/2011 | Doublet ..................... 428/195.1 |
| 2001/0018113 | A1 | 8/2001 | Mallol et al. |
| 2003/0014647 | A1 | 1/2003 | Bourrieres et al. |
| 2003/0056914 | A1 | 3/2003 | Mallol et al. |
| 2003/0161017 | A1 | 8/2003 | Hudson et al. |
| 2003/0223616 | A1 | 12/2003 | D'Amato et al. |
| 2004/0107848 | A1 | 6/2004 | Kaule |
| 2005/0244720 | A1 | 11/2005 | Doublet |
| 2006/0097511 | A1 | 5/2006 | Keller |
| 2006/0249042 | A1 | 11/2006 | Heim et al. |

FOREIGN PATENT DOCUMENTS

| | | | |
|---|---|---|---|
| EP | 0467601 | A2 | 1/1992 |
| EP | 0279880 | B1 | 9/1993 |
| EP | 0613786 | B1 | 7/1996 |
| EP | 0659936 | B1 | 4/2000 |
| EP | 0768189 | B1 | 5/2000 |
| EP | 0998396 | B1 | 12/2001 |
| EP | 0972111 | B1 | 10/2003 |
| EP | 1023499 | B1 | 5/2004 |
| EP | 1 477 940 | A | 11/2004 |
| EP | 1087872 | B1 | 7/2005 |
| EP | 1782108 | B1 | 2/2011 |
| GB | 2 304 077 | A | 3/1997 |
| GB | 2 324 065 | A | 10/1998 |
| GB | 2338680 | A | 12/1999 |
| WO | 99/13157 | A1 | 3/1999 |
| WO | 99/35819 | A1 | 7/1999 |
| WO | 03/091042 | A2 | 11/2003 |
| WO | 2004/009372 | A2 | 1/2004 |
| WO | 2004/020218 | A1 | 3/2004 |

OTHER PUBLICATIONS

Kurz, opposition to EPO counterpart EP1674286B1 filed Dec. 1, 2011.

De La Rue, opposition to EPO counterpart EP1674286B1 filed Dec. 2, 2011.

Giesecke et al., opposition to EPO counterpart EP1674286B1 filed Dec. 2, 2011.

Increased-size copy of the 100-Gulden Netherlands banknote of Sep. 1, 1992; cited as E12 in Kurz opposition to EPO counterpart EP1674286B1.

Schell, "History of Document Security", in de Leeuw and Jan Bergstra, "The History of Information Security, A Comprehensive Handbook," Elsevier B.V., Amsterdam, The Netherlands, Chapter 8, pp. 212-213, 218-219, 223 (2007); in English; cited as E13 in Kurz opposition to EPO counterpart EP1674286B1.

* cited by examiner

SECURITY ELEMENT HAVING A DIGITISED MARK AND SECURITY SUPPORT OR DOCUMENT COMPRISING SAME

The invention relates to a security element such as security thread, carrying a digitised mark which appears as three-dimensional mark when viewed in transmitted light. The invention is also related to a security support or document comprising this security element.

Usually security elements such as security threads are included in security papers and documents to improve security against counterfeiting and used for identification/authentication of the documents, in particular of banknotes.

These threads are made of a substrate, the most often a polyester film, that carry a metallic mark (image or logo or text) obtained from a metallisation/demetallisation process such as described for example in the patent application EP-A-279880. In this case, the mark is uniform and in one colour. The mark can be also printed with metallic inks or coloured inks and are is usually designed on basis of standard fonts. Being viewed in the transmitted light, these kinds of marks carried by these threads once embedded in a paper appear flat and two dimensional because of simple design with only demetallisation or printing enhancing frames of the design.

Another disadvantage of these threads is they can be imitated rather easily by using printing methods open to every body.

The present invention seeks to provide security papers/documents having enhanced anti-forgery properties by providing security elements such as threads carrying mark with better appearance.

An object of the invention is therefore a security element comprising a carrier substrate comprising a transparent or translucent area carrying at least one digitised mark made of at least one set of dots appearing as three-dimensional mark when viewed in transmitted light.

The dots are arranged in such a way that the mark looks like a multi-tone mark. The mark can represent any pattern such as images (portrait, animals, landscape, etc), symbols, letters, alphanumeric symbols, lines, guilloches and the like.

The said digitised mark can be made of a set of dots of various shapes and/or various sizes, with eventually a specific frequency modulation. For example the dots can be in the form of square, round, diamond or of elongated shape such as lines. The dots can be inclined lines according to specific angles, with a specific frequency modulation. These dots can define positive and/or negative marks.

One of the advantages of this security element according to the invention is that the dots will be impossible to be imitated by a counterfeiter with the required precision, so counterfeiting can be detected by observation with eventually the help of a magnifying glass for example.

In a particular embodiment of the invention, the said digitised mark comprises dots observed with UV and/or IR radiations. These kinds of dots can be visible dots containing also UV or IR observable pigments or they can be invisible dots.

In a particular embodiment of the invention, the said digitised mark is made of dots that, at least partially, represent coded data, in particular a matrix code. For example, the code can be related to space position of dots and/or opacities and/or sizes and/or shapes and/or thicknesses and/or colours of dots.

In a preferable embodiment of the invention, the said security element is in an elongated form, in particular a thread or stripe.

The security element could be also a patch.

The said digitised mark is made of deposits and/or voids of material selected among metal, metal compound, alloy, metallic varnish or ink, and metallically appearing varnish or lacquer These dots are preferably applied onto the carrier substrate by printing and/or by metallisation and/or partial demetallisation techniques.

Suitable as a carrier substrate according to the invention are, for example, carrier films, preferably flexible plastics films, for example of PI, PP, MOPP, PE, PPS, PEEK, PEK, PEI, PSU, PAEK, LCP, PEN, PBT, PET, PA, PC, COC, POM, ABS, PVC. Preferably, the carrier substrate is made of polyester, in particular PET.

The carrier films preferably have a thickness of 5 to 700 μm, preferably 5 to 200 μm, particularly preferably 5 to 50 μm.

Furthermore, paper or composites with paper, for example, composites with plastics with a grammage of 20-500 g/m$^2$, preferably 40-200 g/m$^2$, can be used also as carrier substrate.

Furthermore, fabrics or nonwovens, such as endless fibre nonwovens, staple fibre nonwovens and the like, which may possibly be needled or calendered, can be used as carrier substrates. Such fabrics or nonwovens preferably consist of plastics, such as PP, PET, PA, PPS and the like, but fabrics or nonwovens of natural, possibly treated fibres, such as viscose fibre nonwovens, can also be used. The fabrics or nonwovens used have a grammage of about 20 g/m$^2$ to 200 g/m$^2$. If appropriate, the fabrics or nonwovens can be surface-treated.

In a particular embodiment of the invention, the said digitised mark is printed. The dots may be applied by printing, e.g. by rotogravure printing, flexo printing, offset- and screen-printing and digital printing.

Printing cylinders for appropriate seamless or non seamless printing processes may be produced as described below.

Rotogravure cylinders may be made in many different ways to get a printing device for the press machine.

The base is typically made of iron, respectively steel, with a wall thickness about 15 to 25 mm, being linked to the strength of the base width of a cylinder. The wall thickness depends on the pressure of the doctor blade and the pressure of the impression roller.

Next layer is a preferably about 7 μm thick nickel layer. This layer is used as adhesive layer for the following copper layer. The copper layer has to be 30 μm thick minimum, typically a thickness of 300 μm is appropriate.

The surface of the copper layer is grinded to a specified roughness. This roughness depends which ink and printing substrate will be used. Typical cylinder roughness is RA=0.05.

After preparing the base, the rotogravure cylinder will be prepared with data. Today there are three main processes that are laser engraving, stylus engraving and etching. These three processes have common settings like screen, wall size, cell depth, screen angle, etc.

Typically the settings are as follows: screen from 5 l/cm to 500 l/cm, cell depth from 1 to 200 μm, screen angle from 0 to 90 degrees, wall size from 0 to 100 μm.

Laser engraving can be done in copper or chromium which is the top layer for maximum surface hardness (improving the lifetime of a cylinder). A special laser with a beam width of typically 10 μm is shooting directly into the metal and creates each possible geometric form or cell structures (Hell process).

A special laser engraving process may be done in zinc and was developed by Dätwyler company in Switzerland. On top of the copper layer, a zinc layer is produced by electroforming and being grinded to the requested roughness of the printing process. A laser is shot directly into the zinc layer to create the cells or geometric form.

Both processes are limited by the beam width of the laser. They are limited today to 10,000 Pixels/mm$^2$.

Stylus engraving is the mechanical way to produce rotogravure cylinders. A diamond stylus is moving forward in a frequency with alternating voltage (AC) between 2-13 kHz and is controlled by a constant-voltage (DC). The frequency defines the speed of the engraving and the constant-voltage (DC) the cell depth. For the stylus an angle between 90-150° is used. The maximum cell depth is linked to the stylus angle. The smaller the angle is, the cell will be deeper.

New stylus engraving methods are developed by Hell or Dätwyler companies, which have now promoted the Xtreme or TranScribe engraving. In these processes the stylus is not controlled by a frequency with alternating voltage (AC), but only by constant-voltage (DC). In this case the stylus cuts like a knife small parts into the cylinder. The best resolution which may be achieved is 5 μm. This means 40,000 Pixel/mm$^2$. The engraving time is 20 times higher as the "normal" engraving. The cell depth itself is also limited to the mechanical strength of the diamond and is around 20 μm.

Etching was one of the first methods for rotogravure cylinder production. It is now used in combination with laser treatment to produce premium quality for security printing processes. A ready made copper cylinder is coated by a photo resist lacquer and exposed to a laser beam with a beam width down to 2 μm. This means 250,000 Pixel/mm$^2$ may be achieved. After developing, the cylinder is etched with copper-chloride, ferro-chloride or with electrical copper reduction. An appropriate process is disclosed in DE 10159539, the disclosure of which is incorporated herein by reference.

To produce the etching shield a black lacquer can be coated to the cylinder surface and be burned of by laser. In this case the maximum resolution is 10,000 Pixel/mm$^2$.

The last step is to protect the cylinder surface with chromium which is made as a last step in the cylinder production.

Flexo printing cylinders can be made from polymeric or elastomeric materials. Polymers are mainly used as photopolymer in plates and sometimes as a seamless coating on a sleeve. To produce a photopolymer cylinder, the surface has to be exposed with UV light by using a film. The possibility is to coat the plate first with a black lacquer to remove all printing parts by laser and expose it to UV light. After exposing the uncured material is removed during a washing process. The screen which will be used is between 10 and 70 l/cm and is equal to photopolymer plates and seamless sleeves. The plates will be mounted after the production step on top of a sleeve.

Direct laser engraving can be made in polymeric and elastomeric material, like rubber. It is mainly made seamless, but it is also possible to do it on plates.

The resolution is the same as with photopolymer. The sleeve is mounted to a mandrel and can be used in a printing press. Very important is the anilox roller which gives you the ink density or image detail control. To get good print quality the printing screen has to be multiplied with 7 or 9 compared to the screen of the roller. This results typically to a screen of about 54 l/cm, with an anilox roller with 350 l/cm. The ink density decreases the higher screen number of the anilox roller.

Digital printing means the possibility that to have different or the same repeating length of one motive on one substrate. Typical processes are Inkjet (including solvent and water based inks UV sensible inks and dyes), liquid or dry toner based systems e.g. HP Indigo, Xeikon, Xerox and systems using ultrasonic, photo-acoustic, or piezo effects to control the ink flow from the printing heads to the substrate.

Depending on the resolution desired, the digitised marks (three dimensional appearing design) are produced setting different conditions in the printing mode. In a particular embodiment, the said digitised mark is printed, with positive and/or negative aspect, with inks containing pigments chosen from carbon black pigments, dark magnetic pigments, one-colour pigments and their mixtures. Besides these pigments could also have additional properties such as fluorescence, phosphorescence, specific detection and so on.

Preferably metals, metallic or metallic appearing coatings are used.

Further the security element may be produced by a PVD or CVD process.

In this case, a carrier substrate is treated by means of an on-line plasma, corona or flame process or ion bombardment and the coating according to the invention is then applied either on-line or in a subsequent process step in a PVD or CVD process.

The carrier substrate is preferably treated by means of an on-line plasma (low pressure or atmospheric plasma), corona or flame process. By means of high-energy plasma, for example an Ar or Ar/$O_2$ plasma, the surface is cleaned of any scumming residues which may be present. In this case, for a partial application, the necessary sharp delimitation of the contours of the recesses, which is needed for the necessary precision of decoding, is also achieved. In the process, polar groups standing on end are produced at the surface. This improves the adhesion of metals and the like to the surface.

If appropriate, at the same time as the application of the plasma or corona or flaming treatment is carried out, a thin transparent metal or metal oxide layer can be applied as an adhesion promoter, for example by means of sputtering or vapour deposition. In this case, Cr, Al, Ag, Ti, Cu, $TiO_2$, Si oxides or chromium oxides are particularly suitable. This adhesion promoting layer generally has a thickness of 0.1 nm to 5 nm, preferably 0.2 nm to 2 nm, particularly preferably 0.2 to 1 nm.

As a result, the adhesion of the partial or full-area coatings is improved further. Metals and their compounds, for example oxides, sulphides, or alloys, are particularly suitable.

Suitable metals are, for example, Al, Cu, Fe, Ag, Au, Cr, Ni, Zn, Cd, Bi and the like. Suitable as metal compounds are, for example, oxides or sulphides or chromates of metals, in particular $TiO_2$, Cr oxides, ZnS, ITO, Bi oxide, ATO, FTO, ZnO, $Al_2O_3$, Zn chromate, Fe oxides, CuO and the like or silicon oxides. Suitable alloys are, for example, Cu—Al alloys, Cu—Zn alloys, iron alloys, steel, for example Cr—Ni steel and the like.

The coating is applied in a PVD or CVD process. In a PVD process, the coating is deposited on the carrier substrate under a vacuum (up to $10^{-12}$ mbar, preferably $10^{-2}$ to $10^{-6}$ mbar) at a temperature which depends on the vapour pressure and the thickness and the optical density of the coating to be applied, for example by means of thermal vapour deposition, arc or electron beam vapour deposition. One further possibility is to apply the coating by means of AC or DC sputtering, the appropriate process being selected on the basis of the layer to be applied and the material used. As a plurality of layers is to be applied, separating layers, for example insulators, polymer layers and the like, can be applied between the individual layers, on-line or in a separate process step.

In a CVD process, by mixing the substance to be applied with a gas plasma or with an activation gas, for example CO, $CO_2$, oxygen, silanes, methane, ammonia and the like, a chemical reaction is brought about by means of an ion or electron beam and the substance produced is deposited on the carrier. In this way, a plurality of reactive layers can be applied simultaneously or in parallel, a colour effect may be produced on the carrier substrate.

As the coating is to be applied partially onto the carrier substrate, in a first step, a colour or colour varnish that is soluble in a solvent is applied partially onto the carrier substrate, then in a second step, this layer is treated by means of an on-line plasma, corona or flame process. In the third step, an overall metallic coating is applied by means of a PVD or CVD process, whereupon, in a fourth step, the applied colour is removed together with the metallic coating thereon by means of a solvent, possibly combined with mechanical action, thus resulting in a partial metallic coating.

The application of the varnish applied can be carried out by means of any desired process, for example by means of gravure printing, flexographic printing, screen printing, digital printing and the like. The colour or the colour varnish used is soluble in a solvent, preferably in water, but a colour that is soluble in any desired solvent, for example in alcohol, esters and the like, can also be used. The colour or the colour varnish can be conventional compositions based on natural or artificial macromolecules. The soluble colour or colour varnish can be pigmented or non-pigmented. All known pigments can be used as pigments. Particularly suitable are $TiO_2$, ZnS, kaolin and the like. The treatment already described above by means of on-line plasma (low pressure or atmospheric plasma), corona or flame process and the application of the coating is then carried out.

The coloured layer is then removed by a suitable solvent, which is matched to the composition of the colour layer. The applied colour is preferably water-soluble. If appropriate, the solution can be assisted by mechanical action.

In order to improve the initial dissolving of the covered coloured layer further, a thin pigmented coloured layer or a pure pigment layer can also be applied over the entire area or in register, the thickness of this layer being about 0.01-5 μm. As a result of dissolving the applied colour with the regions of the coating located over the applied colour, the desired partial coating is obtained.

The process described is repeated one or more times applying metal deposits with different optical densities by varying the deposition process parameters.

The said digitised mark can be made of several layers, which are applied to the carrier substrate, and have preferably different optical densities.

Thus different layers with different optical densities are produced, making the final image, symbols, letters, lines looking as three dimensional when observed in transmitted light.

Further layers having specific properties may be present or may be applied subsequently.

The properties of a further layer may be influenced by visible dyestuffs or pigments, luminescent dyestuffs or pigments which fluorescence or phosphorescence in the visible, in the UV range or in the IR range, effect pigments, such as liquid crystals, pearl lustre, bronzes and/or multilayer colour-change pigments and heat-sensitive or pressure sensitive or tactile colours or pigments. These can be employed in all possible combinations. In addition, phosphorescent pigments can also be employed on their own or in combination with other dyestuffs and/or pigments.

Furthermore the security element comprises partial or continuous layers having magnetic and/or electrically conductive and/or optical variable properties Layers having magnetic properties may be present on the substrate or applied subsequently.

Particularly suitable are magnetic-pigment inks with pigments based on Fe oxides, such as $Fe_2O_3$ or $Fe_3O_4$, iron, nickel, cobalt and their alloys, cobalt/samarium, barium- or cobalt-ferrites, hard and soft magnetic steel grades in aqueous or solvent-containing dispersions. Suitable solvents are, for example, i-propanol, ethyl acetate, methyl ethyl ketone, methoxypropanol, aliphatics or aromatics and their mixtures.

The pigments are preferably introduced into acrylate polymer dispersions with a molecular weight of 150 000 to 300 000, in acrylate-urethane dispersions, acrylate-containing, styrene-containing or PVC-containing dispersions or in solvent-containing such dispersions.

Particularly suitable are magnetic inks with pigments based on Cr/Ni steel, Al/$Fe_3O_4$ and the like. These magnetic inks, as opposed to the conventional magnetic inks which appear black brown or grey, exhibit a silvery appearance and, at the same time, exhibit the above-described required magnetic properties. This makes it possible to produce the metallically glossy appearance, desired or required for many applications, in one operation merely by printing these magnetic inks. Overprinting or coating with metallic or metal layers in order to produce the desired appearance is therefore not needed, but can be carried out without difficulty, for example in order to introduce further identification features.

Furthermore, electrically conductive layers can also be present on the substrate or applied subsequently, for example electrically conductive polymer layers or conductive ink or varnish layers can be used.

In order to set the electrical properties, the ink to be applied or the varnish to be applied can have added to it, for example, graphite, carbon black, conductive organic or inorganic polymers, metal pigments (for example copper, aluminium, silver, gold, iron, chromium and the like), metal alloys like copper-zinc or copper-aluminium or else amorphous or crystalline ceramic pigments such as ITO, ATO, FTO and the like. Furthermore, doped or non-doped semiconductors, such as silicon, germanium, doped or non-doped polymer semiconductors or ion conductors such as amorphous or crystalline metal oxides or metal sulphides can also be used as an additive. Furthermore, in order to set the electrical properties of the layer, polar or partially polar compounds such as surfactants, or non-polar compounds such as silicone additives or hygroscopic or non-hygroscopic salts can be used or added to the varnish.

As a layer with electrical properties, a whole-area or partial metal layer can also be applied, it being possible for the partial application to be carried out by means of an etching process (application of a whole-area metal layer and subsequent partial removal by etching) or by means of a demetallisation process.

When a demetallisation process is used, an ink which is soluble in a solvent is preferably applied in a first step (if appropriate in the form of inverse coding), and then, if appropriate following activation of the carrier substrate by means of a plasma or corona treatment, the metal layer is applied, whereupon the soluble ink layer is separated by means of treatment with a suitable solvent, together with the metallization present in these regions.

Furthermore, an electrically conductive polymer layer can also be applied as the electrically conductive layer. The electrically conductive polymers can be, for example, polyaniline or polyethylene dioxythiophene or derivatives thereof.

It is also possible to add carbon black or graphite, for example, to the magnetic ink used, by which means a simultaneously magnetic and also electrically conductive layer with defined coding can be produced particularly advantageously in accordance with the method of the invention.

Furthermore, further surface relief structures as optical variable properties layers, for example diffraction gratings, holograms and the like, are also suitable as additional security features, if appropriate these structures can also to be metallised, at least partially metallised.

If this partial metallisation is applied in register with these relief structures, the appearance of these structures may change. The diffractional structures, especially holograms, may get more visual depth or become more invisible or may create Moiree structures and they can be also detected and read by defined detection means.

For the production of such surface structures, for example UV-curable thermo formable varnish is applied at the very beginning. Then, for example, by demoulding from a die, a surface structure can be produced in this varnish which, at the time of demoulding, has been pre-cured as far as the gel point, the radiation-curable varnish then being cured completely following the application of the surface structure.

As a result of using the UV-curable varnish, following curing, the layers applied thereto, and also a surface structure, which may be introduced if appropriate, are stable even under temperature stress.

The radiation-curable varnish can be, for example, a radiation-curable varnish system based on a polyester system, an epoxy system or a polyurethane system which contains one or more different photo-initiators familiar to those skilled in the art and which, at different wavelengths, can initiate curing of the varnish system to a different extent. For example, a photo-initiator can be capable of activation at a wavelength of 200 to 400 nm, the possible second photo-initiator then at a wavelength of 370 to 600 nm. Between the activation wavelengths of the two photo-initiators, a sufficient difference should be maintained in order that excessive excitation of the second photo-initiator does not take place while the first is being activated. The region in which the second photo-initiator is excited could lie in the transmission wavelength range of the carrier substrate used. For the main curing (activation of the second photo-initiator), electron radiation can also be used.

A varnish that can be diluted with water can also be used as a radiation-curable varnish. Varnish systems based on polyester are preferred.

Furthermore, the security elements according to the invention can be provided, on one or both sides, with a protective varnish layer and/or a hot-melt or cold-seal adhesive or a self-adhesive coating, eventually pigmented. The protective varnish can be pigmented or non-pigmented, possible with all known pigments or dyes, for example $TiO_2$, ZnS, kaolin, ATO, FTO, aluminium, chromium and silicon oxides or, for example, pthalocyanine blue, i-indolide yellow, dioxazine violet. Furthermore, luminescent dyes or pigments which fluoresce or phosphoresce in the visible, in the UV range or in the IR range, effect pigments such as liquid crystals, pearl lustre, bronzes and/or multilayer colour-change pigments and heat-sensitive colours and pigments can be added. These can be used in all possible combinations. In addition, luminescent pigments can also be used on their own or in combination with other dyes and/or pigments.

Furthermore, the security element according to the invention can be provided on one or both sides with a hot-melt or cold-seal adhesive or a self-adhesive coating for application to or embedding in a support, these adhesives or adhesive coatings being possible pigmented.

Furthermore, the security element according to the invention can be laminated with one or more carrier substrates, which, if appropriate, have functional and/or decorative layers, using a lamination adhesive, it being possible for the lamination adhesive also to be pigmented.

The invention is also related to a film material for making the said security elements. The film material is made as described below for the security elements.

The invention is also related to a security support comprising the said security element.

Preferably the said digitised mark of the security element corresponds to a same mark of the support, it means that the design of the said digitised mark is the copy of the design of a mark of the support. In particular the mark design that can be reproduced is a multi-tone watermark incorporated into the security support.

Preferably the security support is a paper based fibres composition having at least one multi-tone watermark, in particular a multi-tone effect watermark made from a screened image.

The process for making a such multi-tone effect watermarks (screened watermark) in a paper is disclosed in the patent application EP-A-1122360. Multi-tone effect watermarks are made of a set of pale zones (and a set of dark zones) in a paper and arranged in the manner of a screened image and appearing as a multi-tone watermarked image when observed in transmitted light.

Advantageously, the data and the software(s) used for making the screened watermark can be used also for making the digitised mark on the security element in the case they are the same.

In a particular embodiment of the invention, the security element is a thread partially embedded in the said support, preferably totally embedded in the support.

This thread can be embedded partially in a paper support and appearing in a window according to the process describes in the patent EP59056. It could be also embedded between two fibrous or film layers comprising window(s).

In another particular embodiment of the invention, the security element is a patch or stripe applied to the said security support, preferably in an area of reduced opacity, a such area could be a hole or a translucent area.

The security support according to the invention can be made basically of fibrous material such as cellulose and/or cotton and/or synthetic fibres. In particular, the support is a paper or a nonwoven.

The security support according to the invention can also be made basically of a plastic film (or plastic sheet) or of a laminate of plastic films or of laminate of at least one fibrous material web and one plastic film.

The plastic film can be a synthetic paper, for example a film Polyart® made by the company ARJOBEX Ltd.

The invention is also related to a security document or article comprising the said security element or security support.

In a particular embodiment, the said digitised mark of the security element corresponds to a mark of the document.

Another possibility can be to make a design related to the country, to the event or any other design related to the document use.

Security documents or articles are valuable/identity documents such as banknotes, cheques, bonds, share certificates, vouchers, data carriers, cards in particular identity cards, visas, passports, licences, brand authentication labels, tamper evidence labels, legal documents and the like. Security article can be packaging material for pharmaceutical, electronics and/or foodstuffs industry, for example in the form of blister films, folding boxes, covers, film packs.

The invention is also related to a method of identification and/or authentication of the security support or document or article, comprising the following steps:

detecting the said digitised mark carried on the security element, analysing the mark by reading the dots, recalculating a mark from the read dots comparing the recalculated mark with stored data.

In a particular embodiment of this method, there is a step of decoding the dots of the said mark and a step of comparing the results of this decoding with stored data.

In another particular embodiment, in the case the said digitised mark is as a mark of the security support or document or article, the said digitised mark is compared with the same mark of the document, in particular by the aid of specific software(s).

Examples according to the invention will now be described with reference to the FIGS. 1 to 3 (not in scale).

Figure 1:
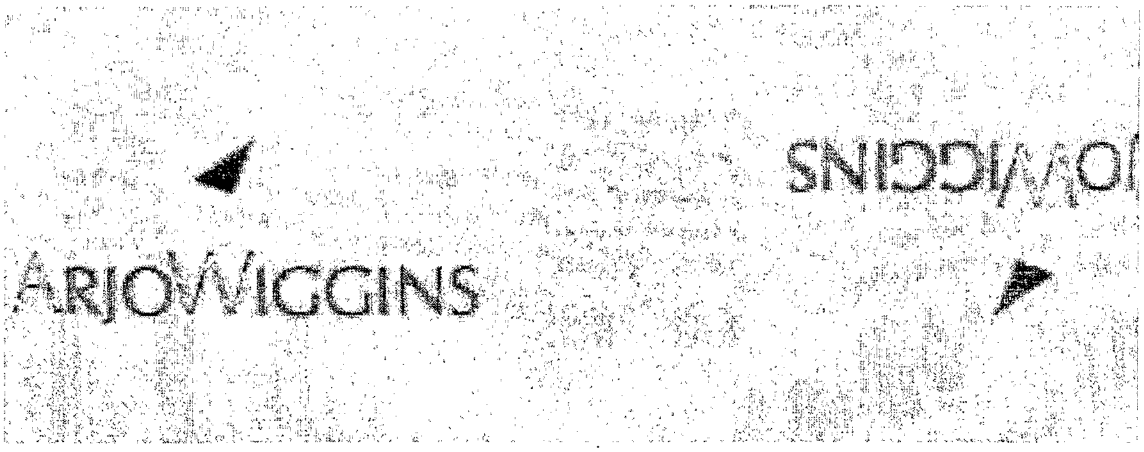
FIG. 1 is a plan view of a security thread.

The security thread of FIG. 1 is a thread made of polyester and of 10 mm width. The digitised image of the lady was printed on a film of polyester using an appropriate software and digitalised data and then the film was cut in threads. This mark is characterised by a succession of dots of different colours arranged in such a way that the mark appears as a three dimensional image.

Figure 3:
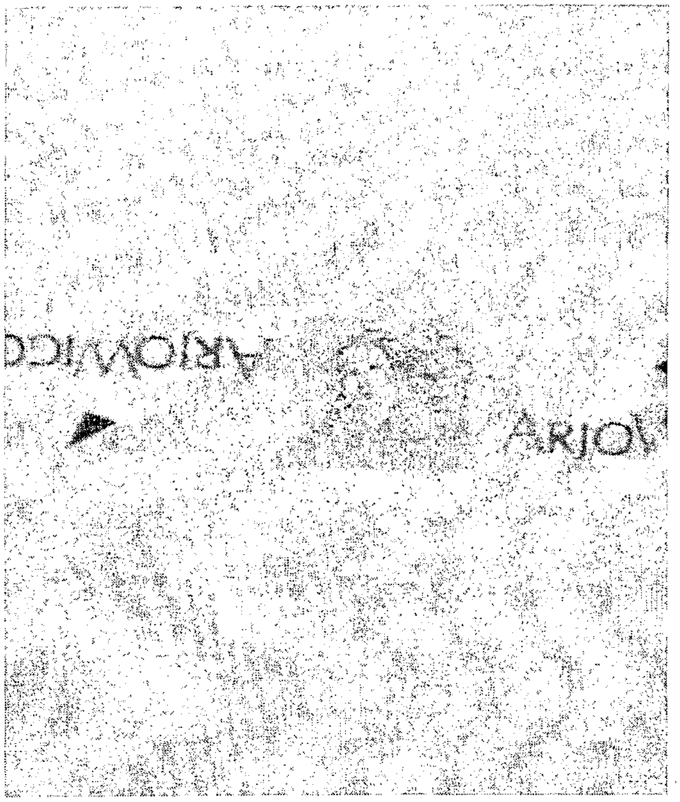
FIG. 3 is a plan view of a security paper incorporating the security thread.
Figure 4:
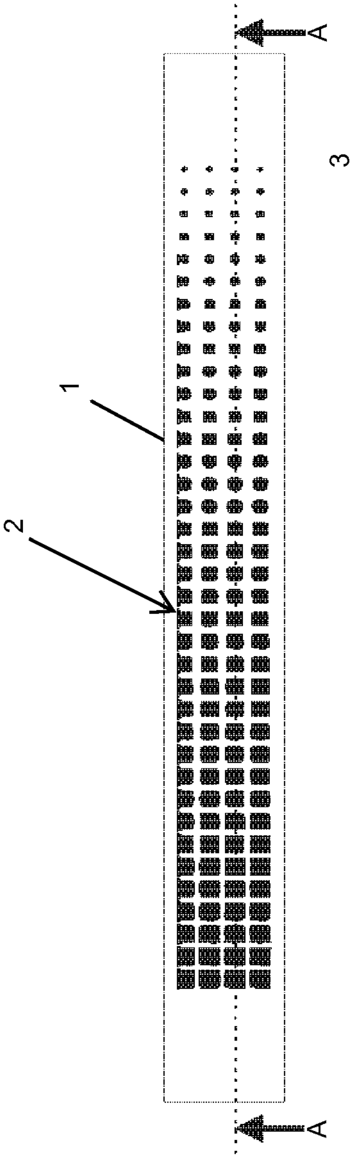
FIG. 4 is a plan view of an illustrative carrier substrate 1 forming a security thread carrying a digitized mark 2 formed of dots of various sizes.
Figure 5:
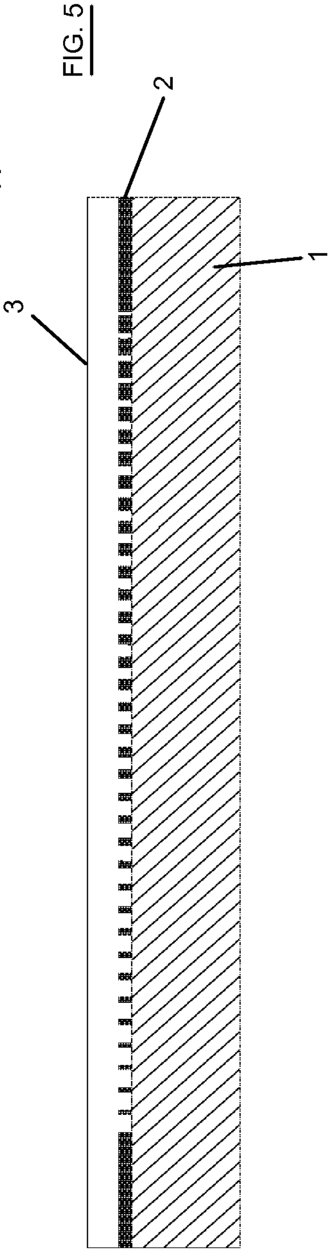
FIG. 5 is a cross-section view of the security thread of FIG. 4 along line A-A of FIG. 4, additionally showing a protective layer applied onto the carrier substrate 1 and over the digitized mark 2.

The security paper of FIG. 3 is a banknote paper incorporating the said security thread. The dots are not visible but the image of the lady is visible as shadow image when the paper is observed in transmitted light and held at about 20 cm from eyes.

Figure 2:
FIG. 2 is a plan view of the enlarged image of the security thread of FIG. 1.

When the paper is observed in close view of a few centimeters these dots are visible by naked eye. When the image is observed with a magnifying glass for instance, these dots are visible and appear as in FIG. 2.

The invention claimed is:

1. Security element comprising:

a carrier substrate comprising a transparent or translucent area having opposed sides;

at least one digitised mark carried by only one of said opposed sides of said transparent or translucent area, wherein the at least one digitised mark is made of a set of dots having different shapes and/or different sizes, wherein the dots are not lines, wherein the at least one set of dots appear as a three dimensional pattern when viewed in transmitted light, wherein a three-dimensional effect of the pattern is created by the arrangement of the dots of different shapes and/or different sizes.

2. Security element according to claim 1, wherein the said digitised mark is made of deposits and/or voids of material selected among metal, metal compound, alloy, metallic varnish or ink, and metallically appearing varnish or lacquer.

3. Security element according to claim 1, wherein the said digitised mark is made of several layers having different optical densities.

4. Security element according to claim 1, wherein the said digitised mark is printed.

5. Security element according to claim 4, wherein the said digitised mark is printed with inks containing pigments chosen from carbon black pigments, dark magnetic pigments, one-colour pigments and their mixtures.

6. Security element according to claim 1, wherein the said digitised mark comprises dots observed with UV and/or IR radiations.

7. Security element according to claim 1, wherein the security element further comprises partial or continuous layers having magnetic and/or electrically conductive and/or optical variable properties.

8. Security element according to claim 1, wherein the dots of the said digitised mark, at least partially, are coded data.

9. Security element according to claim 1, wherein it is further provided with a protective varnish layer and/or a hotmelt or cold-seal adhesive or a self-adhesive coating.

10. Security element according to claim 1, wherein it is in an elongated form.

11. Security support characterised in that it comprises a layer of material and at least one security element according to claim 1 applied on or at least partially embedded in the material layer.

12. Security support according to claim 11, wherein the digitised mark of the security element corresponds to a mark of the material layer of the security support.

13. Security support according to claim 12, wherein the corresponding mark of the support is a watermark or a pseudo-watermark in the material layer of the security support.

14. Security support according to claim 13, wherein the material layer is paper and the corresponding mark of the support is a multi-tone effect watermark.

15. Security support according to claim 11, wherein the security element is in the form of a thread and is at least partially embedded in the material layer of the security support.

16. Method according to claim 15, wherein the security element is totally embedded in the material layer of the security support.

17. Security support according to claim 11, wherein the material layer is made basically of fibrous material.

18. Security support according to claim 17, wherein the material layer is made basically of cellulose and/or cotton and/or synthetic fibres.

19. Security document or article selected among identity cards, visas, passports, banknotes, authentication brand labels, tamper evidence labels, seals, and packaging material, wherein the security document comprises a security element according to claim 1.

20. Method of identification and/or authentication of a security support according to claim 11, comprising the following steps:

detecting the said digitised mark carried on the security element, analysing the mark by reading the dots, recalculating a mark from the read dots, comparing the recalculated mark with stored data.

21. Method according to claim 20, wherein it comprises a step of decoding the dots of the said mark and a step of comparing the results of this decoding with stored data.

22. Method of identification and/or authentication of a security support according to claim 11, wherein the security support comprises a digitised mark identical to the digitised mark of the security element, said method comprising comparing the digitised mark of the security element with the digitised mark of the security support.

23. Method according to the preceding claim 22, comprising the following steps:

detecting the said digitised mark carried on the security element, analysing the mark by reading the dots, recalculating a mark from the read dots, comparing the recalculated mark with stored data.

24. Security element according to claim 1, wherein the set of dots is arranged on the substrate according to a screen of from 54 l/cm to 500 l/cm.

25. Security element according to claim 1, wherein the set of dots is arranged on the substrate according to a screen of from 70 l/cm to 500 l/cm.

26. Security element according to claim 1, wherein the set of dots is arranged on the substrate with a maximum resolution of from 10,000 to 250,000 Pixel/mm$^2$.

27. Security element according to claim 1, wherein the said digitised mark is with a variation of frequency.

28. Security element according to claim 1, wherein the digitised mark is visible but the individual dots are not visible in transmitted light to an observer's eyes when the security element is held at about 20 cm from the eyes.

29. Security element according to claim 1, wherein the said digitised mark is formed by a metallic coating and/or partial removal of a metallic coating, wherein the set of dots is arranged on the substrate according to a specific frequency modulation.

30. Film material for making security elements comprising:

a transparent or translucent substrate having opposed sides;

digitised marks carried by only one of said opposed sides of said transparent or translucent substrate, wherein the at least one digitised mark is made of a set of dots having different shapes and/or different sizes, wherein the dots are not lines, wherein the at least one set of dots appear as a three dimensional pattern when viewed in transmitted light, wherein a three-dimensional effect of the pattern is created by the arrangement of the dots of different shapes and/or different sizes.

31. Film material according to claim 30, wherein the digitised mark is visible but the individual dots are not visible in transmitted light to an observer's eyes when the film material is held at about 20 cm from the eyes.

* * * * *

UNITED STATES PATENT AND TRADEMARK OFFICE

CERTIFICATE OF CORRECTION

PATENT NO. : 8,684,417 B2
APPLICATION NO. : 11/722566
DATED : April 1, 2014
INVENTOR(S) : Mallol et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1145 days.

Signed and Sealed this
Twenty-ninth Day of September, 2015

Michelle K. Lee

*Director of the United States Patent and Trademark Office*